J. GUETTON.
RESILIENT TIRE.
APPLICATION FILED OCT. 11, 1906.
916,440.
Patented Mar. 30, 1909.
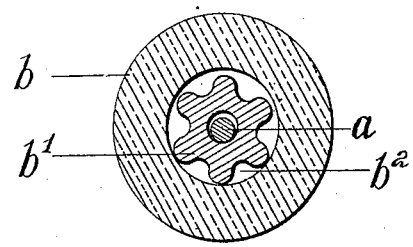
ATTEST.
Benth. Stahl
Ewd L. Folson
INVENTOR.
JOANY GUETTON.
by Richards & Co
Atty's.

UNITED STATES PATENT OFFICE.

JOANY GUETTON, OF LA-TOUR-DE-MILLERY, FRANCE.

RESILIENT TIRE.

No. 916,440.    Specification of Letters Patent.    Patented March 30, 1909.

Application filed October 11, 1906. Serial No. 338,529.

*To all whom it may concern:*

Be it known that I, JOANY GUETTON, a citizen of the French Republic, residing at La-Tour-de-Millery, Rhône, France, have invented certain new and useful Improvements in Resilient Tires, of which the following is a specification.

This invention relates to an improved resilient tire which combines with the elasticity of a pneumatic tire greater strength and durability than are possessed by the latter.

The invention consists in the features of construction and combination and arrangement of parts hereinafter described and particularly pointed out in the claims.

The invention is illustrated in the accompanying drawing which shows a cross section taken through a tire.

As shown the tire comprises outer and inner india rubber members $b$—$b'$, which are compressed in the direction of their longitudinal axes and they are retained in this compressed condition by means of the metal wire $a$, which is contained within the inner member $b'$. As shown, the outer surface of the inner member $b'$ is corrugated so that channels $b^2$ are formed between the two members. These channels may be more or less filled by the greater or less degree of compression of the inner member and the degree of elasticity obtained may be determined by this means. To secure the longitudinal compression the two members $b$, $b'$ are made of a greater length than the outer circumference of the rim to which the tire is to be applied; while the wire $a$ is but slightly greater than the circumference of the rim. In securing the parts together the two members $b$, $b'$ are compressed to expose the two ends of the wire $a$; said ends are then fastened together in any suitable manner and then the members $b$, $b'$ are allowed to expand until the ends thereof come into contact with each other and so cover the ends of the wire, but as said members are of a greater circumference than the rim or the wire $a$ they are not permitted to expand fully and are thus kept in a compressed state.

What I claim as my invention and desire to secure by Letters Patent of the United States is:—

1. A tire comprising two concentric members of resilient material, the material of both members being compressed in the direction of the longitudinal axis of said members, and a member of non-extensible material within the interior resilient member and adapted to retain said resilient members in a compressed condition.

2. A tire comprising two concentric members of resilient material, the inner member having longitudinal grooves in its circumference, and the material of both members being compressed in the direction of the longitudinal axis of said members, and a member of non-extensible material within the interior member and adapted to retain said members in compressed condition.

In witness whereof I have signed this specification in the presence of two witnesses.

JOANY GUETTON.

Witnesses:
GASTON JEAUNIAUX,
MARIN VACHON.